July 13, 1954   J. G. SCHNEEMAN   2,683,812
FLUOROSCOPIC INSPECTION APPARATUS
Filed April 29, 1952   2 Sheets-Sheet 1

INVENTOR.
JUSTIN G. SCHNEEMAN
BY
Fulwider & Mattingly
Attorneys

July 13, 1954  J. G. SCHNEEMAN  2,683,812
FLUOROSCOPIC INSPECTION APPARATUS
Filed April 29, 1952 2 Sheets-Sheet 2

INVENTOR.
JUSTIN G. SCHNEEMAN
BY
Fulwider & Mattingly
Attorneys

UNITED STATES PATENT OFFICE 2,683,812

FLUOROSCOPIC INSPECTION APPARATUS

Justin G. Schneeman, Van Nuys, Calif.

Application April 29, 1952, Serial No. 284,883

15 Claims. (Cl. 250—52)

This invention relates to fluoroscopic inspection apparatus, and has particular reference to an apparatus for fluoroscopically inspecting machine parts such as castings, forgings, stampings, turnings, and the like.

In the manufacture of certain types of machines or structures, particularly where the safety factors are low or where certain parts are critically important, it is necessary that the various parts thereof be critically inspected for flaws or defects which would make them unfit for their intended use. This is particularly true of certain parts for aircraft because of the heavy loads imposed upon such parts and the dire consequences which result in the event of a failure. In such parts as castings, forgings, and stampings, the faults or flaws are oftentimes completely hidden so that the usual visual inspection methods are not sufficient. Destructive testing is unsatisfactory because of the danger of unduly straining or stressing the parts which appear to pass the tests.

In the past such inspections have been made radiographically, but the cost and time consumed have been almost prohibitive. As a result, recourse has been had more recently to fluoroscopic inspection, since such inspections can be carried out much more rapidly and inexpensively than is possible by radiography. However, prior to this invention fluoroscopic inspection was carried out under rather adverse conditions because of the difficulty of handling the parts to be inspected, and because of the ever-present danger of an over-exposure to harmful radiations of the personnel making the inspection.

It is therefore an object of this invention to provide a fluoroscopic inspection apparatus which overcomes the above-mentioned disadvantages by providing complete and continuous shielding to protect the inspection personnel.

It is also an object of this invention to provide an apparatus of the character set forth in the preceding paragraph which includes a mechanism for moving the part to be inspected about during the inspection thereof to insure complete inspection of all portions thereof whereby parts larger than the fluoroscope screen can be completely inspected in a single inspection operation.

It is another object of this invention to provide an apparatus of the character set forth in the preceding paragraphs which includes remote control means for operating the part-moving apparatus to permit the part to be moved during inspection.

It is a further object of this invention to provide an apparatus of the character set forth in the preceding paragraphs which includes a housing or shield for supporting the fluoroscope screen and enclosing the part during inspection, wherein said housing is movable toward and away from the part being inspected to adjust the distance between the part and the screen and to accommodate parts of different sizes.

It is also an object of this invention to provide an apparatus of the character set forth in the preceding paragraph in which said screen is mounted on said housing for adjustable movement relative thereto to permit the distance between said part and said screen to be adjusted without moving said housing.

It is an additional object of this invention to provide an apparatus of the character described in the preceding paragraph which includes a dust-proof bellows for connecting said screen to said housing to prevent accumulation of dust on the surface of said screen.

It is another object of this invention to provide an apparatus of the character set forth hereinbefore which includes a remote control mechanism operable from the exterior of said housing for moving said screen relative to said housing to thereby permit adjustment of said screen during the inspection of a part enclosed by said housing.

It is a still further object of this invention to provide an apparatus of the character set forth in the preceding paragraph which includes means for making radiographic records of an inspected part.

It is an additional object of this invention to provide an apparatus of the character set forth hereinabove wherein a source of penetrating radiations is mounted below a base frame and a part-supporting means is carried by said base frame above said source, and wherein said part-supporting means comprises two carriages, one of which is mounted on said base frame for reciprocable movement in one direction, and the other of which is mounted on said one carriage for reciprocable movement relative thereto in a direction transverse to the direction of movement of said one carriage.

It is also an object of this invention to provide an apparatus of the character set forth in the preceding paragraph which includes a single remote control means for independently controlling the movement of said carriages, together with shielding means for preventing radiations from said source reaching an operator using said control means.

Other objects and advantages of this invention will become apparent upon a consideration of the following specification, read in connection with the accompanying drawings, wherein.

Figures 1, 2, 3, 4, 5, 6:
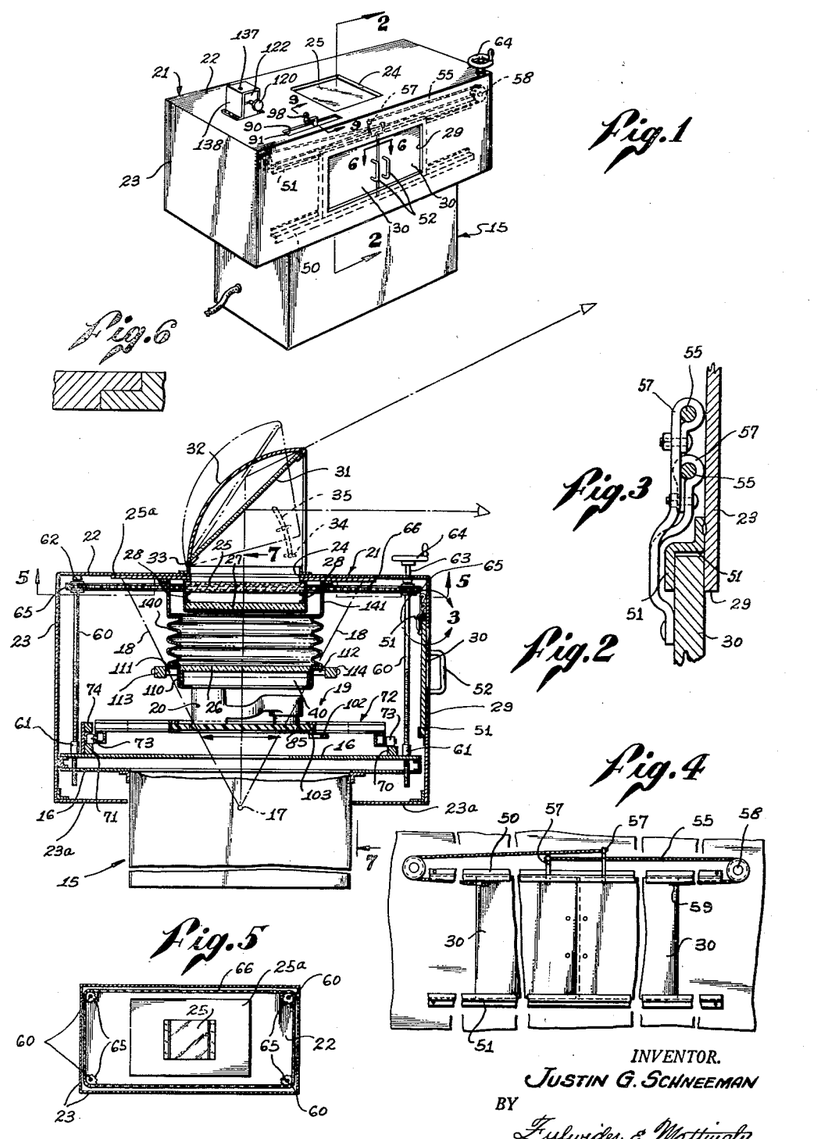
Fig. 1 is a perspective view illustrating the general form, arrangement, and appearance of a preferred embodiment of this invention.
Fig. 2 is a cross-sectional view taken substantially along the line 2—2 of Fig. 1.
Fig. 3 is a fragmentary enlarged sectional view of that portion of Fig. 2 enclosed by the line bearing the numeral 3.
Fig. 4 is a fragmentary side elevational view of the interior of one wall of the housing, illustrating the arrangement for supporting and operating the closures for the access opening into the housing.
Fig. 5 is a sectional view taken substantially along the line 5—5 of Fig. 2.
Fig. 6 is a fragmentary cross-sectional view taken substantially along the line 6—6 of Fig. 1.

Referring to the drawings, there is illustrated in Fig. 1 an apparatus comprising a preferred form of the fluoroscopic inspection apparatus of this invention. As shown in Figs. 1 and 2, this apparatus comprises a box-like base indicated generally by the reference character 15 for supporting the apparatus at a convenient height above the floor or other supporting surface. The supporting base 15 carries on its upper end a horizontally disposed base frame 16 below which is supported a suitable source 17 of penetrating radiations, the source 17 being enclosed within the box-like base 15 which in turn is so constructed as to constitute a suitable shield for the source 17. Ordinarily, the shield will serve to enclose an X-ray tube, but other sources 17 of penetrating radiation may be used, as for example a pellet of a suitably radioactive element. The source 17 of radiations and the shielding 15 are so arranged as to produce an upwardly-directed conical primary beam of penetrating radiations, such as is for example represented by the broken lines 18 in Fig. 2.

The base frame 16 also carries a part-supporting means indicated generally by the reference character 19 in Fig. 2, to be described in more detail hereinafter, which is used to support a machine part 20 during inspection in a position intercepting the conical beam 18 of penetrating radiations. During such inspection, the machine part 20 is enclosed within a shielded space which is defined by the base frame 16 and by an upper housing 21. The upper housing 21 comprises an upper wall 22 and a plurality of side walls 23 which depend from the edges of the upper wall 20 and extend along the outside edges of the base frame 16 to a point below the base frame. Auxiliary shielding flanges 23a secured to the lower edges of the side walls 23 and extending horizontally inward into close proximity to the base 15 serve to prevent the escape of secondary radiations passing between the outer edge of the base frame 16 and the inner surface of the vertical housing walls 23.

The upper wall 22 of the housing 21 is provided with a viewing aperture 24 which is closed by a transparent dust cover 25 formed of glass or like material. The viewing aperture is surrounded by a thick shield 25a formed of lead or other material which is impervious to the penetrating radiations, the shield 25a being secured to the undersurface of the upper housing wall 22 and having a sufficient lateral extent to intercept the entirely of the primary beam 18 of penetrating radiations, thus insuring against the escape of dangerous radiations through penetration of the upper housing wall 22.

Below the viewing aperture 24 and above the machine part 20 there is supported a fluorescent screen 26, the screen 26 being supported by apparatus to be described in detail hereinafter for vertical movement relative to the upper wall 22 of the housing 21. Above the fluorescent screen 26 there is moved a transparent cell 27 which is impervious to the penetrating radiations. The cell 27 and the cover glass 25 may be supported by suitable channel members 28 which are in turn carried by the upper housing wall 22. The cell 27 may comprise a relatively thick sheet of lead glass, in which event the two members 25 and 27 may both be made of lead glass or alternatively a single member of adequate thickness may be employed. Also, if desired, the cell 27 may comprise a liquid cell of the type known as an X-ray cell constituting an appropriate liquid such as perchloric acid or lead oxide perchloric acid or similar material enclosed between the glass plates 25 and 27.

The machine parts to be inspected are inserted into the shielded space within the interior of the housing 21 through a suitable access opening 29 provided in one of the side walls 23, the access opening 28 being fitted with appropriate shielded closures 30 to prevent the undesired escape of injurious radiations during the operation of the apparatus.

It will be seen that with the apparatus thus far described, the machine part 20, when positioned to intercept at least a portion of the beam 18 of penetrating radiations, will cause different areas of the fluorescent screen 26 to fluoresce to differing intensities so as to produce on the fluorescent screen 26 a shadowgraph of the machine part 20. An inspector may view this fluoroscopic image by looking downwardly through the glass cover 25 and the transparent cell 27. Flaws such as concealed cracks, porous areas, cavities, and the like are readily found by such examination.

Preferably the apparatus is so arranged as to make it unnecessary for the inspector to lean over the apparatus to look at the screen 26, and according to a modification of the invention such as is illustrated in Fig. 2, this is accomplished by disposing a mirror 31 in a suitably inclined position above the viewing aperture 24. The mirror 31 may be mounted within a hood 32 which is hingedly secured at its lower rear edge as by a hinge 33 to the upper housing wall 22. The hood 32 may be pivotally moved about the axis of the hinge 33 to adjust the degree of inclination of the mirror 31, and may be secured in any adjusted position by means of a clamping screw 34 secured to the hood and extending through an arcuate slot 35 provided in an upstanding portion of the upper wall 23, as is illustrated diagrammatically in Fig. 2.

Oftentimes it is desired to make a permanent record of the condition of any inspected machine part which has been found to be faulty, and the apparatus forming the subject matter of this invention is therefore arranged to permit the making of a suitable radiograph of any inspected part. To this end there is provided a pair of guide channels 40 and 41 secured to the side edges of the screen 26 for receiving the edges of a plate holder carrying the well known X-ray film or plate, the guide channels 40 and 41 serving to hold the plate holder in position during the making of the radiograph.

The preferred construction of the access doors 30 is illustrated in Figs. 1 through 4, and 6. As is shown in those figures, the access opening 29 is bounded on its upper and lower edges by guide channels 50 and 51 adapted to receive and slidably support a pair of access doors 30 so that the doors may be moved from abutting positions closing the opening 29 as shown in Fig. 1, to positions disposing one of the doors to the right of the opening and the other to the left thereof. Handles 52 secured to the doors 30 permit the doors to be manually moved between these two positions. The abutting edges of the doors 30 are preferably rabetted as shown in Fig. 6 to positively prevent the escape of radiation between the doors when the same are closed.

Preferably the doors are interconnected so that they may both be opened or closed by the use of only one hand. To this end each door is connected to the other by means of a cable 55 which extends from a clip 57 secured to one of the doors around a pulley 58 secured to the side wall 23 of the housing, and returns to a point of fixed connection 59 to the other of the doors. With this arrangement the manual movement of one door forces the other door to execute a like movement.

In order to obtain the maximum in clarity and definition in the fluoroscopic image it is necessary that the fluorescent screen 26 be positioned as close to the upper surface of the machine part 20 as possible. Accordingly, in order to permit the screen 26 to be so adjusted with respect to the workpiece and to permit workpieces of differing vertical dimensions to be inspected, this invention provides for adjusting the distance between the main frame 16 and the fluorescent screen 26. According to this invention, such adjustment is obtained by moving the housing 21 vertically with respect to the base frame 16, and it is for this reason that the side walls 23 of the housing are carried down over the outside and beyond the edges of the base frame 16 and turned inwardly as by the flanges 23a.

According to this invention, the housing 21 is supported from the base frame 16 by a plurality of jack screws 60, each of which is threadedly engaged with a nut 61 secured to the base frame 16 so that by rotation of the screws 60 the same may be moved axially and vertically relative to the base frame 16. The upper ends of the jack screws 60 are carried in thrust bearings 62 secured to the underside of the upper wall 22 so that the housing 21 will be raised and lowered as the jack screws 60 are rotated.

As is best shown in Figs. 2 and 5, the embodiment of the invention shown in Fig. 1 includes four such jack screws 60 located at the four corners of the rectangular housing. One of the jack screws is provided with an upwardly extending drive spindle 63 which extends through the upper wall 22 and which has attached to its upper end a hand wheel 64 or other suitable means for rotating the associated jack screw.

Synchronous rotation of the four jack screws is obtained by mounting a chain sprocket 65 on each of the jack screws just below the thrust bearings 62, and by employing a chain 66 which encircles all of the chain sprockets 65. By this means, rotation of the one jack screw by means of the handle 64 causes the other jack screws to rotate synchronously therewith so that the entire housing 21 is raised or lowered relative to the base frame 16 and kept on an even keel during such raising and lowering movement.

The described arrangement for adjusting the distance between the fluorescent screen and the machine part being inspected has the advantage of maintaining a fixed distance between the machine part and the force of radiations, and the further advantage of maintaining completely shielded at all times and regardless of the adjusted position of the fluorescent screen the space within the housing 23 within which the machine part is confined, thus positively precluding all possibility of the escape of dangerous radiations.

Figures 8, 9, 10, 11, 12:
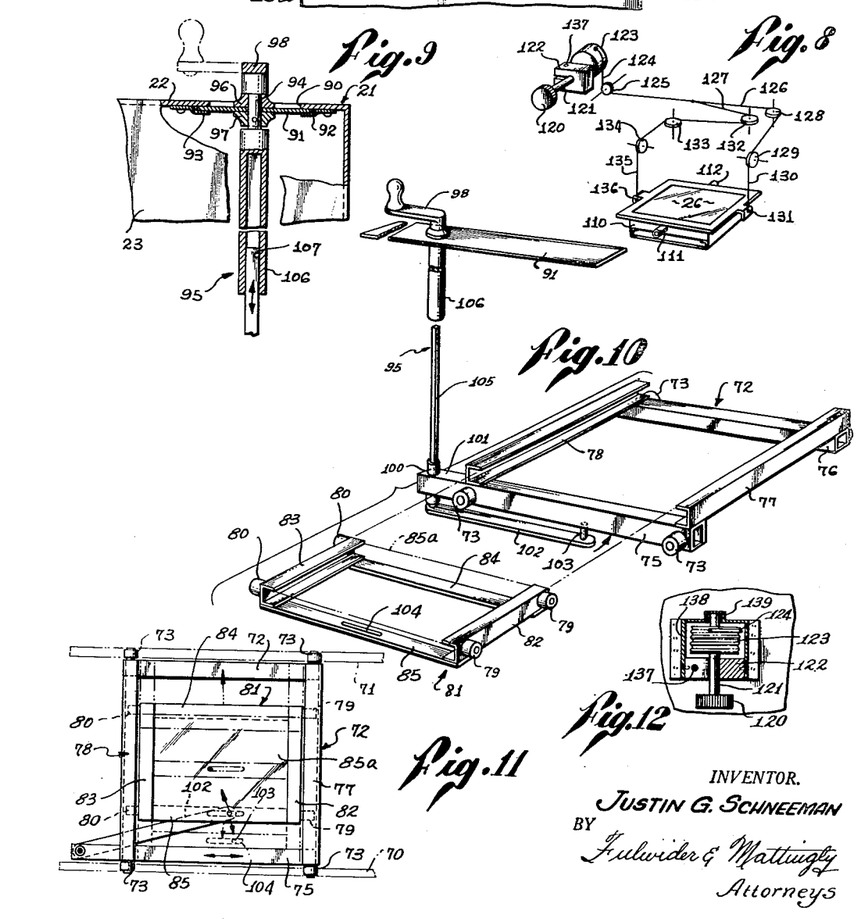
Fig. 8 is a diagrammatic perspective view illustrating the arrangement of the remote control mechanism used to actuate the screen adjustment device shown in Fig. 7.
Fig. 9 is a fragmentary cross-sectional view taken substantially along the line 9—9 of Fig. 1.
Fig. 10 is an exploded perspective view illustrating the construction of the part-supporting means and the control apparatus therefor.
Fig. 11 is a fragmentary plan view of the apparatus shown in Fig. 10.
Fig. 12 is a fragmentary sectional view taken substantially along the line 12—12 of Fig. 7.

It often happens that the machine part to be examined has a greater horizontal dimension than the corresponding width or depth of the beam of penetrating radiations, making it necessary for the machine part to be shifted from place to place to permit the entire part to be inspected. The apparatus of this invention provides for so moving the machine part during the inspection thereof, and without the necessity of opening the enclosure or turning off the source of radiations. To this end the base frame 16 is provided with a guide rail 70 on one side thereof extending preferably parallel to the longest dimension of the base frame, a corresponding guide rail 71 being provided on the opposite side of the base frame and extending parallel to the guide rail 70. A carriage indicated generally in Fig. 2 at 72 and illustrated in detail in Fig. 10 is provided with rollers 73 which roll upon the rails 70 and 71 to permit the carriage 72 to be moved back and forth within the housing 21. To prevent overturning of the carriage 72, the guide rail 71 preferably includes an upper rail member 74 which overlies the roller 73 to prevent the carriage from being lifted from its tracks.

As is best shown in Fig. 10, the carriage 72 preferably comprises a pair of longitudinal members 75 and 76 held in parallel spaced relation to each other by transverse members 77 and 78. The aforementioned rollers 73 are pivotally supported on the outer vertical surfaces of the longitudinal members 75 and 76, there being a pair of the rollers 73 mounted on the member 75 to run on the rail 70, and there being a similar pair of rollers 73 mounted on the other longitudinal member 76 to run on the rail 71. The transverse members 77 and 78 are of a length appropriate to space the rollers 73 in accordance with the spacing of the guide rails 70 and 71.

The transverse members 77 and 78 are preferably of channel form so as to receive between the upper and lower flanges thereof two pairs of rollers 79 and 80 mounted upon an upper carriage indicated generally at 81. The upper carriage 81 comprises a pair of transverse members 82 and 83 upon which the rollers 79 and 80 are mounted, the transverse members 82 and 83 being spaced in accordance with the longitudinal spacing of the lower carriage members 77 and 78 by longitudinally extending strap members 84 and 85a.

The transverse members 82 and 83 of the upper carriage 81 are preferably also of channel form to receive between their upper and lower flanges a suitable sheet of material such as is represented by the dotted lines 85 in Fig. 9, the sheet 85 constituting a deck upon which the part to be inspected is placed. The deck 85 should be made of a material which is transparent to the penetrating radiation, and may conveniently be formed of a synthetic resin or plastic such as an acrylic resin or a phenol formaldehyde derivative.

The lower carriage 72 is given a length somewhat less, but approximating, the distance from the center of the beam of penetrating radiations to one end of the housing 21 so that in moving from one extreme position to the other along the rails 70 and 71, all parts of the lower carriage 72 may be placed over the center of the beam 18. In a similar way, the upper carriage 81 is given a length transversely of the housing 21 which is approximately equal to one-half of the depth of the housing from front to back so that by moving the upper carriage 81 between its two extreme positions with respect to the lower carriage 72, all parts of the upper carriage, and therefore all parts of a machine part placed on the deck 85 thereof, may be positioned in the beam 18.

The apparatus is so arranged as to permit the two carriages 72 and 81, and therefore the machine part resting on the deck 85, to be moved to any desired position as above described without requiring that the access doors 30 be opened. To this end there is provided in the upper wall 22 of the housing 21 an elongated slot 90. The slot 90 is closed by a shield 91 which is mounted inside the housing 21 and which has a width somewhat greater than the width of the slot 90. The shield 91 is carried in guide brackets 92 and 93 so that it may slide relative to the upper wall 22 in a direction lengthwise of the slot 90. The shield 91 preferably has a length exceeding twice the length of the slot 90 so that the slot will be completely closed regardless of any sliding of the shield 91.

The shield 91 supports the upper end 94 of an operating shaft indicated generally at 95, the portion 94 being journaled for rotation in a suitable aperture provided in the shield 91 as by means of journal members 96 and 97. The upper end 94 of the shaft 95 is provided with a suitable handle or crank 98 by means of which the shaft 95 may be rotated or may be moved in translation along the length of the slot 90.

The lower end of the operating shaft 95 is journaled for rotation in a suitable journal 100 secured to the lower carriage 72 as, for example, by being secured to an extension 101 of the longitudinal member 75 thereof. To the lower end of the operating shaft 95 there is secured a crank arm 102, the outer end of the crank arm 102 carrying an upstanding pin 103 which is received in a longitudinal slot 104 provided in one of the longitudinal members of the upper carriage 81 as is shown, for example, in the longitudinal member 85a.

It will be seen that rotation of the shaft 95 will angularly move the arm 102, and by reason of the pin and slot connection 103, 104, cause the upper carriage 81 to be moved transversely of the lower carriage along its guides 77 and 78. In the same way, moving the upper end of the operating shaft 95 in translation along the length of the slot 90 will cause the lower carriage 72 and the upper carriage 81 carried thereby to be moved along the guide rails 70 and 71 for the lower carriage. Thus the handle 98 may be employed by an operator of the described apparatus to position as described with respect to the beam 18 a machine part 20 resting upon the deck 85 of the carriage mechanism.

The operating shaft 95 preferably includes a telescoping joint, and to this end the lower portion of the shaft shown at 105 in Fig. 9 is given a square or other non-circular cross-section to be slidably and non-rotatably received within an upper tubular part 106 which is secured to the upper portion 95 and which is provided with an interior bore 107 of non-circular cross-section corresponding to the shape of the shaft portion 105. With this arrangement, the sleeve portion 106 may be axially mixed with respect to the lower portion 105 while maintaining a driving engagement in rotation between the parts 105 and 106. The lengths of the parts 105 and 106 are made sufficient to provide an adequate driving engagement for moving the lower carriage 72 in response to the sliding of the handle 98 along the length of the slot 90. The telescopic construction described maintains the necessary operating engagement between the handle 98 and the carriage assembly 19, regardless of vertical adjustment of the position of the housing 21 through use of the hand wheel 64.

Experience in the fluoroscopic inspection of machine parts has indicated that while in general it is desirable to dispose the fluorescent screen 26 as close to the part 20 as possible, it is oftentimes desirable to raise the screen 26 for the critical inspection of a detected flaw or defect, since increasing the distance between the screen 26 and the part 20 produces a substantial magnification of the image observed. While such enlargement of the image is accompanied by some loss of definition, the enlargement of the image is nevertheless often extremely helpful in evaluating the nature or character of the detected flaw or defect. Changing the spacing between the fluorescent screen 26 and the machine part 20 could, of course, be accomplished by manipulation of the handle 64 to raise the entire housing 21. This adjustment is, however, relatively slow and cumbersome, being provided primarily for the purpose of setting the machine up to handle a run of machine parts of substantially the same vertical dimension. It is for this reason that this invention provides a mounting structure for supporting the fluorescent screen 26 from the housing 21 in such a manner as to permit the screen 26 to be adjustably moved relative to the housing. This structure is illustrated in Figs. 2, 7, 8 and 12.

According to this invention, the fluorescent screen 26 is carried by a frame 110 from opposite sides of which project a pair of pintles 111 and 112. The pintles 111 and 112 are received in appropriate openings provided at the ends of a pair of arms 113 and 114. The arms 113 and 114 are pivotally secured as indicated at 115 in Fig. 7 to one end wall 23 of the housing 21, the pivot 115 preferably being mounted in the upper portion of the housing so that all portions of the arms 113 and 114 are at all times above the undersurface of the fluorescent screen 26. Cross tie members 116 and 117 serve to interconnect the arms 113 and 114.

Figure 7:
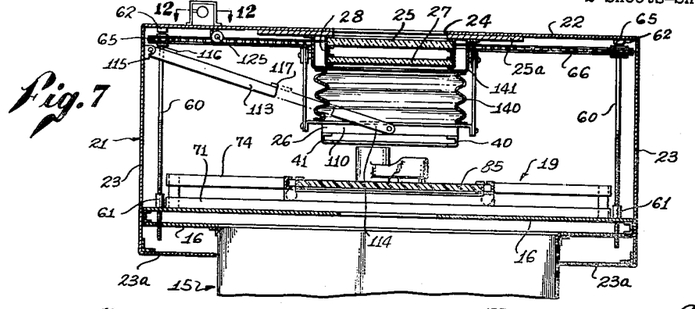
Fig. 7 is a longitudinal sectional view taken substantially along the line 7—7 of Fig. 2.

It will be seen that the arms 113 and 114 will permit the fluorescent screen 26 to be moved toward and away from the upper housing wall 22 through pivotal movement of the arms about the fixed pivot 115. In so moving, the fluorescent screen 26 travels along an arcuate path, but by making the arms 113 and 114 relatively long as illustrated in Fig. 7, the difference between this arcuate movement and movement along a straight vertical path is sufficiently small to be unimportant.

A remote control mechanism is provided for moving the fluorescent screen 26 in the manner described from the exterior of the housing 21 so as to allow the screen to be adjusted in position relative to the part 20 without requiring that the access doors 30 be opened. This control mechanism includes a control member or knob 120 secured to a shaft 121 which is journaled for rotation in a split bearing block 122 secured to the upper surface of the housing 21 in a suitably accessible location. On the opposite end of the shaft 121 there is provided a drum 123 to which one end of a cable 124 is attached.

As may be best seen in the diagrammatic showing of Fig. 8, the cable 124, after passing into the interior of the housing 21 through a suitable opening in the upper wall 22 thereof, passes around a sheave 125 and extends horizontally to a point adjacent one side of the viewing aperture 24. Near this point, the cable 124 is divided, and continues as a pair of separate cables 126 and 127. The cable 126 passes around a pair of sheaves 128 and 129 to extend vertically as shown at 130 to have its lower end connected as at 131 to one side of the frame 110 which supports the fluorescent screen 26. In a similar manner, the cable portion 127 passes around sheaves 132, 133, and 134 to extend downwardly as shown at 135 and be attached at its lower end as indicated at 136 to the frame 110 at a point directly opposite the point of attachment 131 for the cable portion 126.

The points of attachment 131 and 136 are disposed on a line extending at right angles to a line connecting the pintles 111 and 112, and are positioned midway of the length of the respective sides of the frame 110 to which the cables are attached.

It will be seen that by rotating the knob 120, the cable 124 will be wound upon the drum 123, and this will serve to move upwardly at equal rates of speed the two opposite sides of the screen frame 110. The remote control mechanism thus serves to hold the fluorescent screen 26 parallel to the deck 85 while at the same time providing an external control by means of which the screen 26 may readily be moved toward and away from the part 20.

In order that the screen 26 may be held in any adjusted position in which it may be placed through manipulation of the knob 120, the split bearing block 122 is provided to impose a sufficient amount of frictional resistance opposing the rotation of the shaft 121 to prevent the screen 26 from falling of its own weight when the knob 120 is released. As is shown in Fig. 12, a clamping screw 137 is provided for adjusting the degree of frictional resistance thus imposed upon the rotation of the shaft 121.

Preferably the bearing block 122 and the drum 123 are enclosed within a suitable housing 138 which is secured in any suitable manner to the upper surface of the upper housing wall 22. If desired, the housing 138 may be provided with a journal 139 to rotatably support the rear end of the shaft 121.

Since accumulations of dust on the surface of the fluorescent screen 26 will seriously impair the utility of the fluoroscopic inspection apparatus, and since such apparatus is often used in foundries and similar dusty locations, means is provided for preventing the accumulation of dust on the surface of the screen 26. In the form of the invention shown in this application, this means preferably takes the form of a collapsible bellows 140 secured at its lower end to the peripheral portion of the upper surface of the screen frame 110 and secured at its upper end to a suitable tubular supporting structure 141 surrounding the cell 27 and depending from the upper housing wall 22. In this way the screen 26 is enclosed within a dust-free enclosure while at the same time the bellows 140 permits the vertical adjusting movement of the screen 26 as described.

It will be understood that normally the screen 26 will be disposed as far below the upper wall of the housing 21 as is possible with the bellows 140 fully extended, adequate clearance for receiving the part 20 being obtained by raising the housing 21 to an appropriate position. By so adjusting the parts, it is possible to achieve a maximum magnification of the image through manipulation of the knob 120.

An important feature of this invention resides in constructing the part-supporting mechanism 19 in such a way that the part 20 to be inspected is supported very close to the base frame 16. By mounting the source 17 within the housing 15 in the highest possible position, and by disposing the fluorescent screen 26 as close as possible to the upper surface of the part 20, it is possible to reduce to a matter of inches the distance from the source 17 to the screen 26. By this means, a brilliant image is obtained on the fluorescent screen through the use of relatively low power sources of the penetrating radiations and permits such relatively low power sources to produce a beam of sufficient intensity at the location of the part to permit fluoroscopic examination of die cast parts, which parts, because of their high zinc content, have heretofore defied inspection by fluoroscopic means, being substantially opaque to X-ray beams of low intensity.

From the foregoing it will be observed that this invention provides a novel apparatus for use in the fluoroscopic inspection of machine parts, and that the apparatus is characterized by complete shielding so as at all times to prevent exposure of the operating personnel to dangerous radiations from the source of penetrating radiations. Attention is directed particularly to the novel mechanism for adjusting the normal distance between the fluorescent screen and the machine part so as to permit a ready adjustment of this distance in accordance with the thickness of the part to dispose the screen very close to the part to thereby obtain the maximum in definition and clarity of the fluoroscopic image. It will also be observed that by providing the described mechanism for adjusting the position of the fluorescent screen relative to the machine part independently of adjustment of the housing 21, it is possible during the inspection to change the screen location and vary the magnification of the image observed. The invention provides a mechanism for making this adjustment which includes dust-proofing apparatus serving to positively prevent accumulations of dust on the surface of the fluorescent screen. Attention is also directed particularly to the apparatus described for movably mounting the machine part within the apparatus so that it may be moved about during inspection, thus insuring that all parts of the machine part will be subjected to the fluoroscopic inspection, and providing for controlled variation of the angle of incidence of the radiation relative to the surfaces of the part, thus effecting a great saving in time and insuring against overlooking defects which might otherwise remain undiscovered.

Finally, attention is directed to the fact that this apparatus provides for the making of permanent radiographic records of the condition of any inspected parts found to be faulty, and allowing such radiographic records to be made at will as required and without endangering any of the operating personnel.

While the preferred embodiment of this invention has been illustrated and described herein, the same is not to be limited to the details shown and described, except as defined in the appended claims.

I claim:

1. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; part-supporting means on said base frame adapted to support said machine parts in a position intercepting said upwardly-directed radiations; a housing above said frame and carried by said frame and formed of a material of such composition and thickness as to be substantially impervious to said radiations, said housing including an upper wall and depending side walls extending below said frame, said housing and said frame completely enclosing said parts to prevent escape of radiations to the exterior of said housing, said housing having a viewing aperture in said upper wall thereof in alignment with said beam of radiation and having an access opening in one of the side walls thereof for the insertion and removal of said parts; a shielded closure for said opening; a fluorescent screen in said housing intercepting said beam above said part-supporting means; mounting means mounting said screen on said housing for movement relative thereto toward and away from said part-supporting means; and an extensible bellows between said screen and said housing surrounding said screen at its lower end and surrounding said viewing aperture at its upper end.

2. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; a housing above said frame and carried by said frame and formed of a material of such composition and thickness as to be substantially impervious to said radiations, said housing including an upper wall and depending side walls extending below said frame, said housing and said frame completely enclosing a part-receiving space to prevent escape of radiations to the exterior of said housing, said housing having a viewing aperture in said upper wall thereof in alignment with said beam of radiations and having an access opening in one of the side walls thereof communicating with said part-receiving space for the insertion and removal of said machine parts therefrom; a shielded closure for said opening; part-supporting means on said base frame adapted to support said machine parts in a position intercepting said upwardly-directed radiations; a fluorescent screen carried by said housing in a position intercepting said beam above said part-supporting means; and means mounting said part-supporting means on said frame for reciprocal horizontal movement within said housing along two axes extending transversely of each other to thereby permit one of said parts to be placed in any desired location relative to said beam of radiations.

3. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; a housing above said frame and carried by said frame and formed of a material of such composition and thickness as to be substantially impervious to said radiations, said housing including an upper wall and depending side walls extending below said frame, said housing and said frame completely enclosing a part-receiving space to prevent escape of radiations to the exterior of said housing, said housing having a viewing aperture in said upper wall thereof in alignment with said beam of radiations and having an access opening in one of the side walls thereof communicating with said part-receiving space for the insertion and removal of said machine parts therefrom; a shielded closure for said opening; part-supporting means on said base frame adapted to support said machine parts in a position intercepting said upwardly-directed radiations; a fluorescent screen carried by said housing in a position intercepting said beam above said part-supporting means; means mounting said part-supporting means on said frame for reciprocal horizontal movement within said housing along two axes extending transversely of each other to thereby permit one of said parts to be placed in any desired location relative to said beam of radiations; and means outside of said housing for so moving said part-supporting means.

4. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; a housing above said frame and carried by said frame and formed of a material of such composition and thickness as to be substantially impervious to said radiations, said housing including an upper wall and depending side walls extending below said frame, said housing and said frame completely enclosing a part-receiving space to prevent escape of radiations to the exterior of said housing, said housing having a viewing aperture in said upper wall thereof in alignment with said beam of radiations and having an access opening in one of the side walls thereof communicating with said part-receiving space for the insertion and removal of said machine parts therefrom; a shielded closure for said opening; a fluorescent screen carried by said housing in a position intercepting said beam above said frame; a first carriage mounted on said frame below said screen for reciprocal horizontal movement in one direction relative to said beam; and a second part-supporting carriage mounted on said first carriage for reciprocal horizontal movement relative thereto in a direction transverse to said one direction to thereby permit one of said parts to be placed in any desired location relative to said beam of radiations.

5. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; a housing above said frame and carried by said frame and formed of a material of such composition and thickness as to be substantially impervious to said radiations, said housing including an upper wall and depending side walls extending below said frame, said housing and said frame completely enclosing a part-receiving space to prevent escape of radiations to the exterior of said housing, said housing having a viewing aperture in said upper wall thereof in alignment with said beam of radiations and having an access opening in one of the side walls thereof communicating with said part-receiving space for the insertion and removal of said machine parts therefrom; a shielded closure for said opening; a fluorescent screen carried by said housing in a position intercepting said beam above said frame; a first carriage mounted on said frame below said screen for reciprocal horizontal movement in one direction relative to said beam; a second part-supporting carriage mounted on said first carriage for reciprocal horizontal movement relative thereto in a direction transverse to said one direction to thereby permit one of said parts to be placed in any desired location relative to said beam of radiations; and control means outside of said housing coupled to both of said carriages for so moving said carriages.

6. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; a housing above said frame and carried by said frame and formed of a material of such composition and thickness as to be substantially impervious to said radiations, said housing including an upper wall and depending side walls extending below said frame, said housing and said frame completely enclosing a part-receiving space to prevent escape of radiations to the exterior of said housing, said housing having a viewing aperture in said upper wall thereof in alignment with said beam of radiations and having an access opening in one of the side walls thereof communicating with said part-receiving space for the insertion and removal of said machine parts therefrom; a shielded closure for said opening; a fluorescent screen carried by said housing in a position intercepting said beam above said frame; a first carriage mounted on said frame below said screen for reciprocal horizontal movement in one direction relative to said beam; a second part-supporting carriage mounted on said first carriage for reciprocal horizontal movement relative thereto in a direction transverse to said one direction, said second carriage including a member having a slot therein extending in said one direction; a pin in said slot; a horizontal arm secured at one end to said pin; a vertically disposed operating shaft secured at its lower end to the other end of said arm; means on said first carriage journaling said shaft for rotation and securing said shaft to said first carriage for translatory movement of said shaft with said reciprocal movement of said first carriage, said housing having in said upper wall thereof an elongated opening extending parallel to said one direction, the upper portion of said shaft extending through said elongated opening; a handle on the upper end of said shaft whereby said shaft may be rotated to move said part-supporting carriage and moved along said elongated opening to move said first carriage; a shield carried by said shaft for translatory movement therewith disposed in a position at all times covering said elongated opening; and means journaling said shaft in said shield.

7. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; a housing above said frame and carried by said frame and formed of a material of such composition and thickness as to be substantially impervious to said radiations, said housing including an upper wall and depending side walls extending below said frame, said housing and said frame completely enclosing a part-receiving space to prevent escape of radiations to the exterior of said housing, said housing having a viewing aperture in said upper wall thereof in alignment with said beam of radiations and having an access opening in one of the side walls thereof communicating with said part-receiving space for the insertion and removal of said machine parts therefrom; a shielded closure for said opening; a fluorescent screen carried by said housing in a position intercepting said beam above said frame; a plurality of vertically disposed jack screws in said housing; thrust bearings interposed between the upper end of each of said screws and said upper wall of said housing; a nut for each of said screws secured to said frame; a drive spindle secured to one of said screws extending to the outside of said housing to permit rotation of said one screw; drive means interconnecting all of said screws for causing synchronous rotation thereof in response to rotation of said drive spindle; a first carriage mounted on said frame below said screen for reciprocal horizontal movement in one direction relative to said beam; a second part-supporting carriage mounted on said first carriage for reciprocal horizontal movement relative thereto in a direction transverse to said one direction, said second carriage having a slot therein extending in said one direction; a pin in said slot; a horizontal arm secured at one end to said pin; a vertically disposed operating shaft secured at its lower end to the other end of said arm; means on said first carriage journaling said shaft for rotation and securing said shaft to said first carriage for translatory movement of said shaft with said reciprocal movement of said first carriage, said housing having in said upper wall thereof an elongated opening extending parallel to said one direction, the upper portion of said shaft extending through said elongated opening; a handle on the upper end of said shaft whereby said shaft may be rotated to move said part-supporting carriage and moved along said elongated opening to move said first carriage; and telescoping means in said shaft between said shield and said first carriage to permit said vertical movement of said housing while maintaining a fixed vertical relation among said housing and said handle and said shield.

8. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; part-supporting means on said base frame adapted to support said machine parts in a position intercepting said upwardly-directed radiations; a housing above said frame and carried by said frame and formed of a material of such composition and thickness as to be substantially impervious to said radiations, said housing including an upper wall and depending side walls extending below said frame, said housing and said frame completely enclosing said parts to prevent escape of radiations to the exterior of said housing, said housing having a viewing aperture in said upper wall thereof in alignment with said beam of radiation and having an access opening in one of the side walls thereof for the insertion and removal of said parts; a shielded closure for said opening; a fluorescent screen in said housing intercepting said beam above said part-supporting means; mounting means mounting said screen on said housing for movement relative thereto toward and away from said part-supporting means; an extensible bellows between said screen and said housing surrounding said screen at its lower end and surrounding said viewing aperture at its upper end; and a transparent cover for said viewing aperture, whereby the upper surface of said screen is exposed only to a dust-free space enclosed by said bellows and said cover.

9. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; part-supporting means on said base frame adapted to support said machine parts in a position intercepting said upwardly-directed radiations; a housing above said frame and carried by said frame and formed of a material of such composition and thickness as to be substantially impervious to said radiations, said housing including an upper wall and depending side walls extending below said frame, said housing and said frame completely enclosing said parts to prevent escape of radiations to the exterior of said housing, said housing having a viewing aperture in said upper wall thereof in alignment with said beam of radiation and having an access opening in one of the side walls thereof for the insertion and removal of said parts; a shielded closure for said opening; a fluorescent screen in said housing intercepting said beam above said part-supporting means; mounting means mounting said screen on said housing for movement relative thereto toward and away from said part-supporting means; and means coacting with said mounting means for holding said screen against angular displacement during movement thereof toward and away from said part-supporting means.

10. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; part-supporting means on said base frame adapted to support said machine parts in a position intercepting said upwardly-directed radiations; a housing above said frame and carried by said frame and formed of a material of such composition and thickness as to be substantially impervious to said radiations, said housing including an upper wall and depending side walls extending below said frame, said housing and said frame completely enclosing said parts to prevent escape of radiations to the exterior of said housing, said housing having a viewing aperture in said upper wall thereof in alignment with said beam of radiation and having an access opening in one of the side walls thereof for the insertion and removal of said parts; a shielded closure for said opening; a fluorescent screen in said housing intercepting said beam above said part-supporting means; mounting means mounting said screen on said housing for movement relative thereto toward and away from said part-supporting means; control means situated on the outside of said housing and coupled to said mounting means for so moving said screen; and means associated with said control means and coacting with said mounting means for holding said screen against angular displacement during said movement thereof.

11. In a fluoroscopic inspection apparatus for use in the inspection of machine parts, the combination of: a horizontally disposed base frame; a shielded source of penetrating radiations supported below said frame for directing a conical beam of said radiations upwardly through the central portion of said frame; part-supporting means on said base frame adapted to support said machine parts in a position intercepting said upwardly-directed radiations; a housing above said frame and carried by said frame and formed of a material of such composition and thickness as to be substantially impervious to said radiations, said housing including an upper wall and depending side walls extending below said frame, said housing and said frame completely enclosing said parts to prevent escape of radiations to the exterior of said housing, said housing having a viewing aperture in said upper wall thereof in alignment with said beam of radiation and having an access opening in one of the side walls thereof for the insertion and removal of said parts; a shielded closure for said opening; a fluorescent screen carried by said housing in a position intercepting said beam above said part-supporting means; mounting means mounting said housing on said frame for vertical movement with respect thereto to move said screen toward and away from said part-supporting means; a pair of arms in said housing, each pivotally attached at one end to said housing, said arms extending along opposite side edges of said screen; means pivotally connecting the other ends of said arms to said opposite side edges of said screen; control means situated on the outside of said housing; coupling means connecting said control means to opposite end edges of said screen for moving said end edges equal distances in the same direction upon manipulation of said control means, whereby said screen may be moved toward and away from said part-supporting means through angular movement of said arms while said screen is held against angular displacement; an extensible bellows between said screen and said housing surrounding said screen at its lower end and surrounding said viewing aperture at its upper end; and a transparent cover for said viewing aperture, whereby the upper surface of said screen is exposed only to a dust-free space enclosed by said bellows and said cover.

12. In a fluoroscopic inspection apparatus for use in the inspection of machine parts, the combination of: a horizontally disposed base frame; a shielded source of penetrating radiations supported below said frame for directing upwardly a conical beam of said radiations; part-supporting means on said base frame adapted to support said machine parts in a position intercepting said upwardly-directed radiations; a housing above said frame for enclosing parts supported by said part-supporting means, said housing having a viewing aperture in alignment with said beam of radiations and having an access opening for the insertion and removal of said parts; a fluorescent screen in said housing intercepting said beam above said part-supporting means; mounting means mounting said screen on said housing for movement relative thereto toward and away from said part-supporting means; and means co-acting with said mounting means for holding said screen against angular displacement during movement thereof toward and away from said part-supporting means.

13. In a fluoroscopic inspection apparatus for use in the inspection of machine parts, the combination of: a horizontally disposed base frame; a shielded source of penetrating radiations supported below said frame for directing upwardly a conical beam of said radiations; a housing above said frame defining an enclosed part-receiving space, said housing having a viewing aperture in alignment with said beam of radiations and having an access opening communicating with said part-receiving space for the insertion and removal of said machine parts therefrom; a fluorescent screen carried by said housing in a position intercepting said beam above said frame; part-supporting means on said base frame adapted to support said machine parts in a position intercepting said upwardly directed radiations; and means mounting said part-supporting means on said frame for reciprocal horizontal movement within said housing along two axes extending transversely of each other to thereby permit one of said parts to be placed in any desired location relative to said beam of radiations.

14. In a fluoroscopic inspection apparatus for use in the inspection of machine parts, the combination of: a horizontally disposed base frame; a shielded source of penetrating radiations supported below said frame for directing upwardly a conical beam of said radiations; a housing above said frame defining an enclosed part-receiving space, said housing having a viewing aperture in alignment with said beam of radiations and having an access opening communicating with said part-receiving space for the insertion and removal of said machine parts therefrom; a fluorescent screen carried by said housing in a position intercepting said beam above said frame; a first carriage mounted on said frame below said screen for reciprocal horizontal movement in one direction relative to said beam; and a second part-supporting carriage mounted on said first carriage for reciprocal horizontal movement relative thereto in a direction transverse to said one direction to thereby permit one of said parts to be placed in any desired location relative to said beam of radiations.

15. In a fluoroscopic inspection apparatus for use in the inspection of machine parts; the combination of: a horizontally disposed base frame; a shielded source of penetrating radiations supported below said frame for directing upwardly a conical beam of said radiations; a housing above said frame defining an enclosed part-receiving space, said housing having a viewing aperture in alignment with said beam of radiations and having an access opening communicating with said part-receiving space for the insertion and removal of said machine parts therefrom; a fluorescent screen carried by said housing in a position intercepting said beam above said frame; a first carriage mounted on said frame below said screen for reciprocal horizontal movement in one direction relative to said beam; a second part-supporting carriage mounted on said first carriage for reciprocal horizontal movement relative thereto in a direction transverse to said one direction, said second carriage including a member having a slot therein extending in said one direction; a pin in said slot; a horizontal arm secured at one end to said pin; a vertically disposed operating shaft secured at its lower end to the other end of said arm; means on said first carriage journaling said shaft for rotation and securing said shaft to said first carriage for translatory movement of said shaft with said reciprocal movement of said first carriage, said housing having an elongated opening extending parallel to said one direction, the upper portion of said shaft extending through said elongated opening; and a handle on the upper end of said shaft whereby said shaft may be rotated to move said part-supporting carriage and moved along said elongated opening to move said first carriage.

References Cited in the file of this patent

UNITED STATES PATENTS

| Number | Name | Date |
| --- | --- | --- |
| 1,617,758 | Heynemann | Feb. 15, 1927 |
| 2,041,682 | Adrian | May 26, 1936 |
| 2,099,185 | Adrian | Nov. 16, 1937 |
| 2,169,483 | Adrian | Aug. 15, 1939 |
| 2,298,942 | Hicks et al. | Oct. 13, 1942 |
| 2,343,846 | Robinson | Mar. 7, 1944 |
| 2,360,326 | Adrian et al. | Oct. 17, 1944 |

FOREIGN PATENTS

| Number | Country | Date |
| --- | --- | --- |
| 564,805 | Great Britain | Oct. 13, 1944 |